(12) United States Patent  
Itakura

(10) Patent No.: US 9,836,624 B2
(45) Date of Patent: Dec. 5, 2017

(54) INFORMATION PROCESSING DEVICE AND METHOD, TO PREVENT HOT INSERTION AND EXTRACTION OF SIM TRAY

(75) Inventor: Kotochika Itakura, Nagano (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 14/116,200

(22) PCT Filed: May 9, 2012

(86) PCT No.: PCT/JP2012/061860
§ 371 (c)(1),
(2), (4) Date: Nov. 7, 2013

(87) PCT Pub. No.: WO2012/157487
PCT Pub. Date: Nov. 22, 2012

(65) Prior Publication Data
US 2014/0101466 A1    Apr. 10, 2014

(30) Foreign Application Priority Data
May 17, 2011    (JP) ................................. 2011-110365

(51) Int. Cl.
*G06F 1/32* (2006.01)
*G06F 21/85* (2013.01)
(Continued)

(52) U.S. Cl.
CPC ............ *G06F 21/85* (2013.01); *G06F 1/32* (2013.01); *G06K 7/0069* (2013.01);
(Continued)

(58) Field of Classification Search
CPC .................. G06F 1/26; G06F 1/28; G06F 1/32
(Continued)

(56) References Cited

U.S. PATENT DOCUMENTS 5,389,001 A    2/1995  Broschard, III et al.
5,561,653 A *  10/1996  Liou ..................... G11B 33/00
                                                      360/99.06
(Continued)

FOREIGN PATENT DOCUMENTS

JP    6252991    9/1994
JP    6260243    9/1994
(Continued)

OTHER PUBLICATIONS

International Search Report Application No. PCT/JP2012/061860, dated Aug. 7, 2012.

*Primary Examiner* — Jaweed A Abbaszadeh
*Assistant Examiner* — Keshab Pandey
(74) *Attorney, Agent, or Firm* — Chip Law Group

(57) ABSTRACT

The present technique relates to an information processing device, an information processing method, a record medium and a program which can prevent hot insertion and extraction of an SIM card. A removing unit removes a tray storing a storage member. A removal detector detects an operation of starting removal of the tray before the removing unit removes the tray. A power controller stopping power supplying to the storage member when the removal detector detects the operation of starting the removal of the tray may be employed. The present technique may be applied, e.g., to a personal computer.

12 Claims, 18 Drawing Sheets

(51) Int. Cl.
 G06K 13/067 (2006.01)
 G06K 13/08 (2006.01)
 H04B 1/3816 (2015.01)
 G06K 7/00 (2006.01)

(52) U.S. Cl.
 CPC ......... G06K 7/0086 (2013.01); G06K 13/067 (2013.01); G06K 13/0806 (2013.01); H04B 1/3816 (2013.01)

(58) Field of Classification Search
 USPC ....... 713/300, 310, 320, 321, 322, 323, 324, 713/330, 340, 375
 See application file for complete search history.

(56) References Cited

U.S. PATENT DOCUMENTS

| | | | |
|---|---|---|---|
| 5,664,118 A * | 9/1997 | Nishigaki et al. | 710/304 |
| 6,181,633 B1 * | 1/2001 | Shimakawa | G11C 7/18 365/189.05 |
| 6,944,029 B1 * | 9/2005 | Marcolina | H05K 7/1409 361/732 |
| 2003/0002261 A1 * | 1/2003 | Berry | H05K 7/1489 361/727 |
| 2004/0140359 A1 * | 7/2004 | Learmonth | G06K 13/08 235/441 |
| 2008/0235715 A1 * | 9/2008 | Washiya | G11B 17/051 720/601 |
| 2009/0209811 A1 * | 8/2009 | Higuchi | 600/109 |
| 2009/0307506 A1 * | 12/2009 | He | G06F 1/3209 713/300 |
| 2009/0308930 A1 * | 12/2009 | Poguntke | G06K 7/0021 235/486 |

FOREIGN PATENT DOCUMENTS

| | | |
|---|---|---|
| JP | 2000285204 A | 10/2000 |
| JP | 2008117415 A | 5/2008 |

* cited by examiner

FIG. 18

| REMOVAL DETECTION SWITCH | SIM TRAY DETECTION SWITCH | SIM REMOVAL SIGNAL |
|---|---|---|
| OFF | OFF | HIGH LEVEL |
| OFF | ON | LOW LEVEL |
| ON | OFF | HIGH LEVEL |
| ON | ON | HIGH LEVEL |

INFORMATION PROCESSING DEVICE AND METHOD, TO PREVENT HOT INSERTION AND EXTRACTION OF SIM TRAY

CROSS-REFERENCE TO RELATED APPLICATION

The present application is a national phase entry under 35 U.S.C. §371 of International Application No. PCT/JP2012/061860 filed May 9, 2012, published on Nov. 22, 2012 as WO 2012/157487 A1, which claims priority from Japanese Patent Application No. JP 2011-110365 filed in the Japanese Patent Office on May 17, 2011.

TECHNICAL FIELD

The present invention relates to an information processing device, an information processing method, a record medium and a program, and particularly to an information processing device, an information processing method, a record medium and a program configured to prevent hot extraction and insertion of an SIM card.

BACKGROUND ART

Cellular phones and others are equipped with an SIM (Subscriber Identity Module) card bearing peculiar information identifying a telephone number.

By extracting and inserting the SIM card, a user can use a telephone number for a plurality of cellular phones, or can selectively use a plurality of telephone numbers for one cellular phone.

For inserting or extracting the SIM card into or from the cellular phone, power supply to the SIM card must be stopped before the insertion or extraction. Accordingly, many cellular phones are configured to remove a battery before inserting or extracting the SIM card.

FIG. 1 shows an example of a conventional cellular phone 501. FIG. 1 shows, at A, the cellular phone 501 and a battery 521. An SIM connector for connecting the SIM card is arranged under the battery 521 of the cellular phone 501.

As shown at B in FIG. 1, for example, an insertion opening 522-1A of an SIM connector 522-1 is arranged under the battery 521 of a cellular phone 501-1. A user inserts a SIM card into the SIM connector 522-1 through the insertion opening 522-1A, and uses the cellular phone 501-1.

In an example shown at C in FIG. 1, an SIM connector 522-2 is arranged under the battery 521 of a cellular phone 501-2. A user fits the SIM card downward to the SIM connector 522-2, and uses the cellular phone 501-2.

However, when a user often inserts and extracts the SIM card into or from the cellular phone 501 of which battery 521 is removed for inserting or extracting the SIM card, the user must remove the battery 521 every time the insertion and extraction is required, resulting in inconvenience.

Cellular phones allowing insertion and extraction of an SIM card without removing a battery have been proposed (e.g., see Patent Document 1).

In an example of the Patent Document 1, it is folded in two during non-conversation. For conversation, an SIM card is inserted and extracted through an insertion opening at an end surface of one of two opened casings and particularly at the surface which is in contact with the end surface of the other casing in the open state.

CITATION LIST

Patent Document

Patent Document 1: JP 6-252991 A

SUMMARY OF THE INVENTION

Problems to be Solved by the Invention

However, in the invention of the Patent Document 1, an SIM card may be inserted or extracted without stopping power supply to the SIM card, and thus hot insertion and extraction may occur.

The present technique is provided in view of the above circumstances, and is intended to prevent the hot insertion and extraction of an SIM card.

Solutions to Problems

An information processing device according to an aspect of the present technique includes: a removing unit removing a tray storing a storage member; and a removal detector detecting an operation of starting removal of the tray before the removing unit removes the tray.

The information processing device further includes a power controller controlling power supplying to the storage member, and the power controller may stop the power supplying to the storage member when the removal detector detects the operation of starting the removal of the tray.

The information processing device further includes a tray detector detecting insertion of the tray, and the power controller may start power supplying to the storage member when the tray detector detects the insertion of the tray.

The information processing device further includes a detection determining unit outputting a removal signal based on detection results of the removal detector and the tray detector, and the detection determining unit may output the removal signal at a first level when the removal detector does not detect the operation of starting the removal of the tray, and the tray detector detects the insertion of the tray, and the power controller may start the power supplying to the storage member when the removal signal output from the detection determining unit is at the first level.

The detection determining unit may output the removal signal at a second level when the removal detector detects the operation of starting the removal of the tray, and when the removal detector does not detect the operation of starting the removal of the tray and the tray detector does not detect insertion of the tray, and the power controller may stop the power supplying to the storage member when the removal signal output from the detection determining unit is at the second level.

An information processing method according to an aspect of the present technique includes: a removing step of removing a tray storing a storage member; and a removal detecting step of detecting an operation of starting removal of the tray before the processing in the removing step removes the tray.

A storage medium or a program according to an aspect of the present technique is a computer-readable storage medium bearing a program causing a computer to execute: a removing step of removing a tray storing a storage member; and a removal detecting step of detecting an operation of starting removal of the tray before the processing in the removing step removes the tray.

In an aspect of the invention, the tray storing a storage member is removed, and an operation of starting removal of the tray will be detected before the tray is removed.

Effects of the Invention

The aspect of the present technique can prevent the hot insertion and extraction of the SIM card.

BRIEF DESCRIPTION OF DRAWINGS

FIG. 18 illustrates output of an SIM removal signal.

MODE FOR CARRYING OUT THE INVENTION

Modes (which will be referred to as "embodiments" hereinafter) for carrying out the present technique will be described below. The description will be performed in the following order.
(1) First embodiment
  1. Configuration of personal computer
  2. Configuration of SIM tray detection system
  3. SIM card detection processing
  4. Removal detection processing
(2) Second embodiment
  5. Configuration of SIM tray detection system
  6. Power supply processing
  7. Others First Embodiment

[Configuration of Personal Computer]

Figure 1:
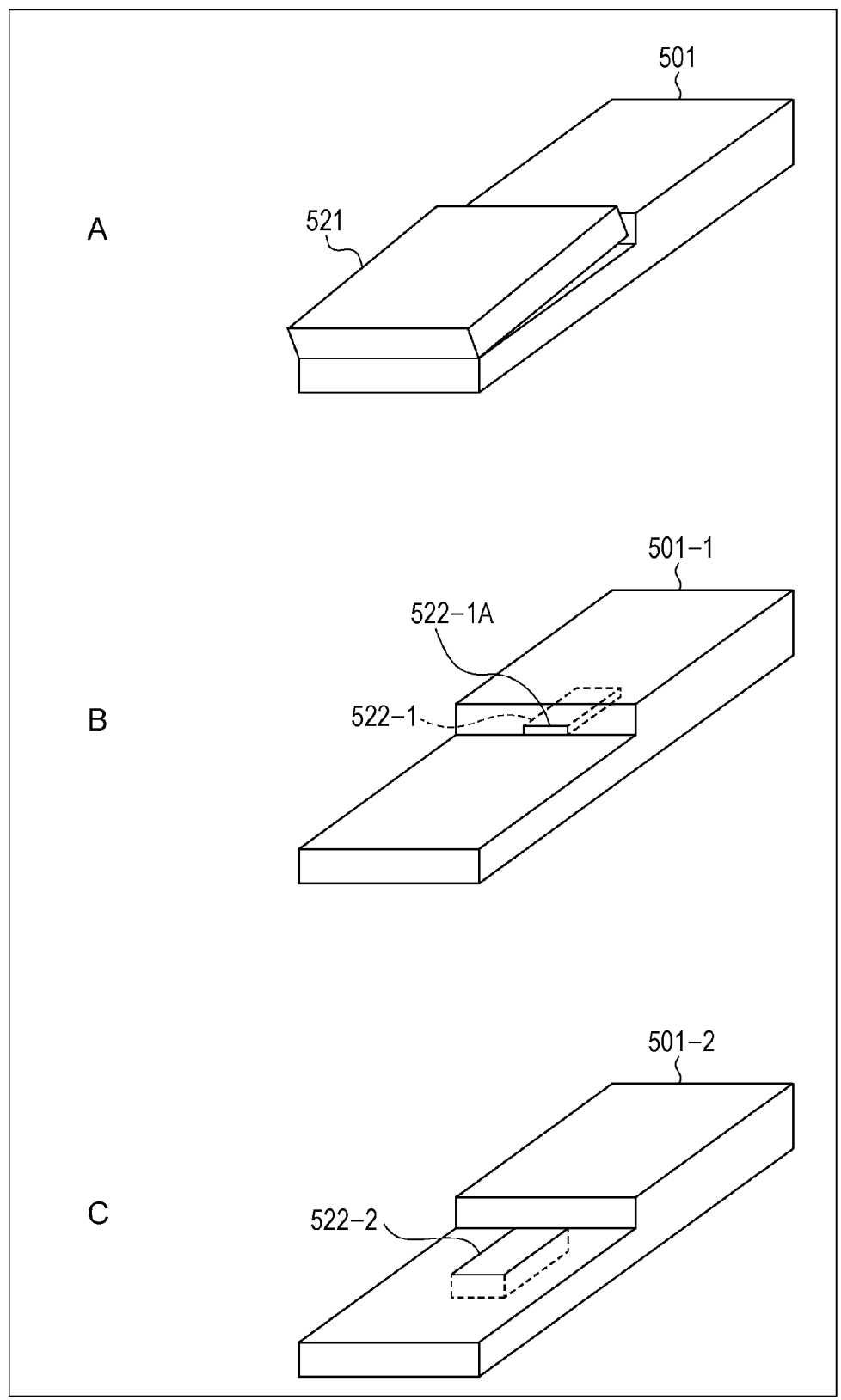
FIG. 1 shows an example of a conventional cellular phone.
Figure 2:
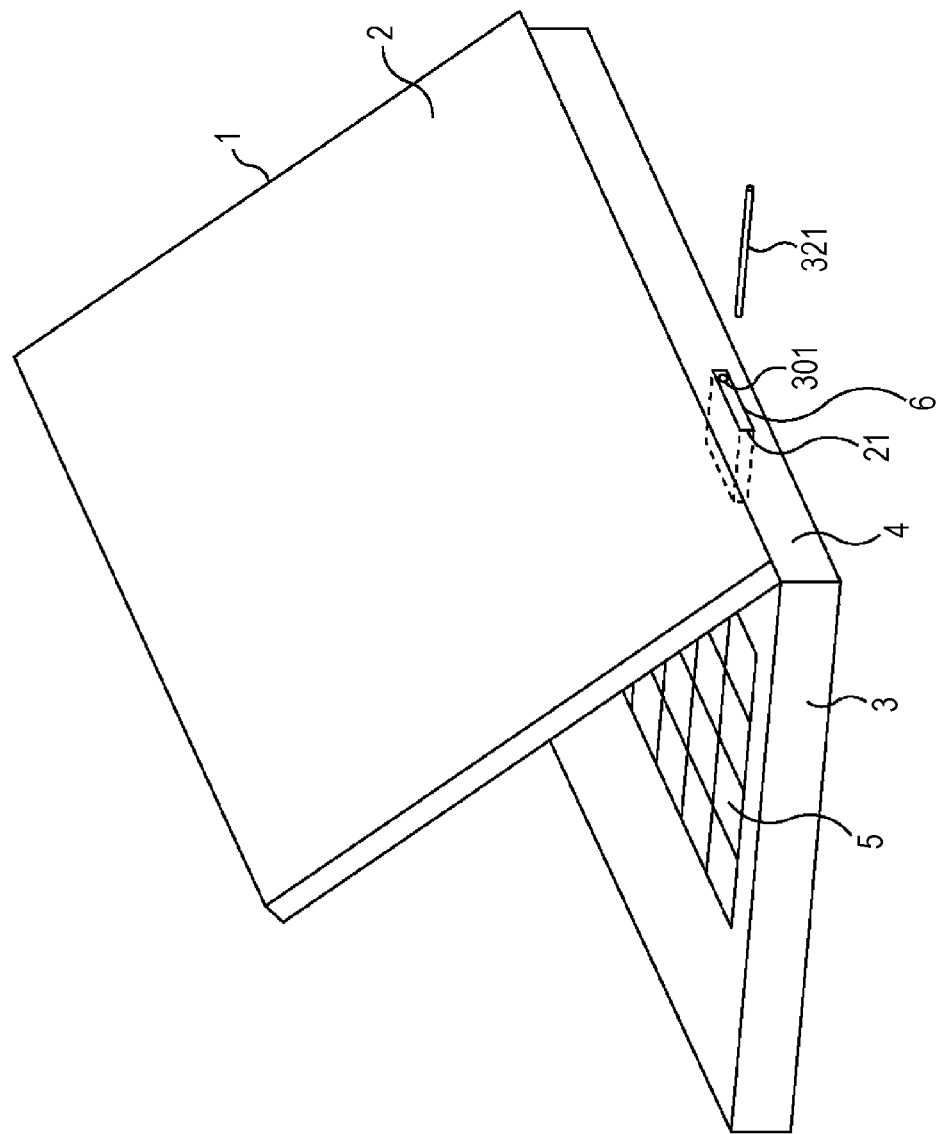
FIG. 2 is a perspective view showing a configuration of a personal computer of the present technique.

FIG. 2 is a perspective view showing a configuration of a personal computer 1 of the present technique. The personal computer 1 has a display (not shown) inside an upper casing 2 which is rotatable with respect to a lower casing 3.

A plurality of keys 5 are arranged on an upper surface of the lower casing 3. An SIM tray 21 storing an SIM card, i.e., a storage member is inserted into a hole 6 in an end surface 4 on a rear side of the personal computer 1.

When a user inserts a pin 321 into a hole 301 in the SIM tray 21, the SIM tray 21 partially projects from the end surface 4 of the lower casing 3 of the personal computer 1.

The user further pulls out a part of the projected SIM tray 21 and, in this state, can remove the SIM card stored in the SIM tray 21.

Figure 3:
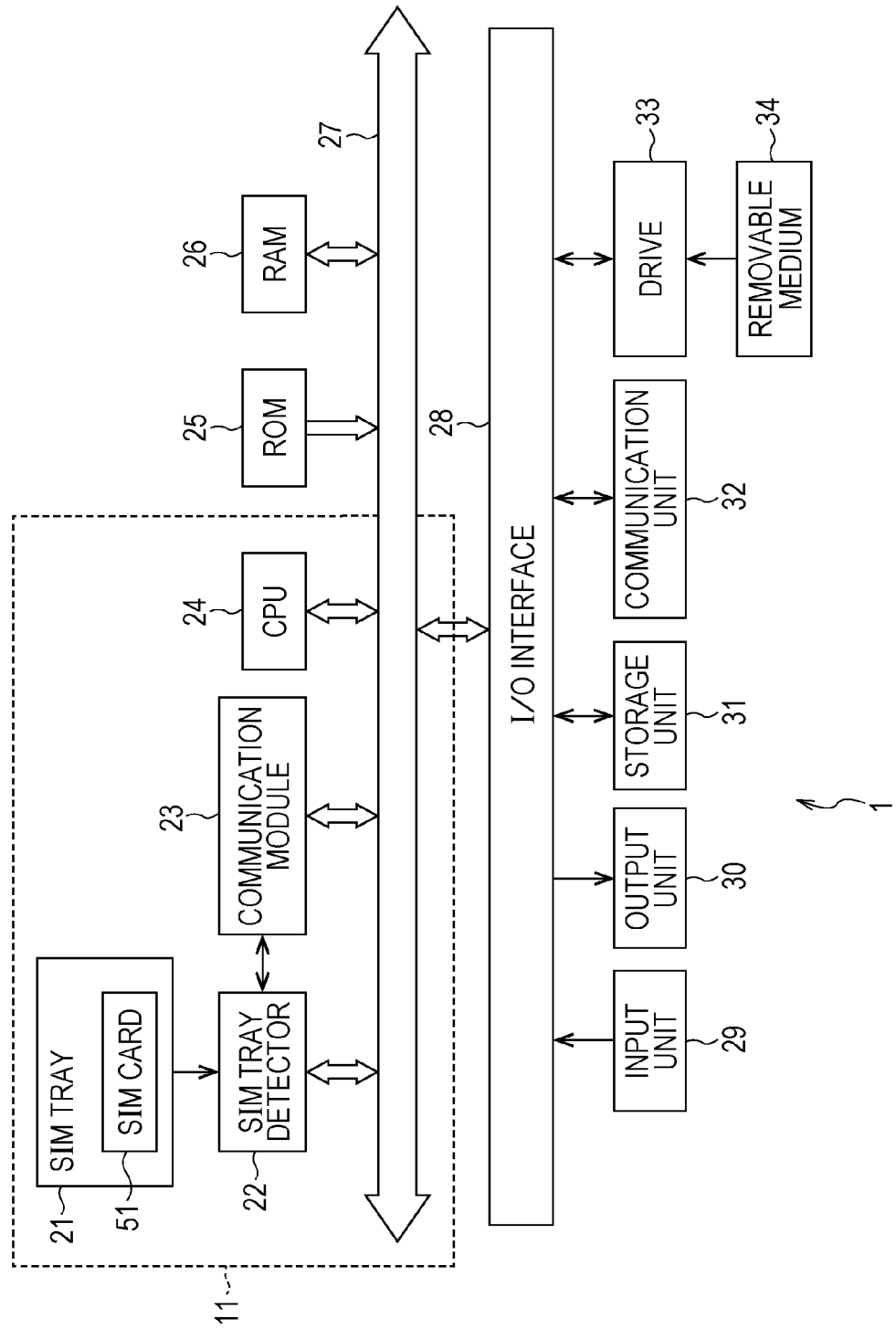
FIG. 3 is a block diagram showing a configuration example of hardware of the personal computer of the present technique.

FIG. 3 is a block diagram showing a configuration example of hardware of the personal computer 1 employing the present technique.

In the personal computer 1, a bus 27 mutually connects an SIM tray detector 22, a communication module 23, a CPU (Central Processing Unit) 24, an ROM (Read Only Memory) 25 and an RAM (Random Access Memory) 26.

The SIM tray detector 22 detects the inserted SIM tray 21, is electrically connected to an SIM card 51 stored in the SIM tray 21 and drives the SIM card 51.

In the personal computer 1, a drive unit 20, the SIM tray 21, the SIM tray detector 22, the communication module 23 and the CPU 24 form an SIM tray detection system 11. Details of the SIM tray detection system 11 will be described later with reference to FIG. 4.

An input/output interface 28 is further connected to the bus 27. The input/output interface 28 is connected to an input unit 29, an output unit 30, a storage unit 31, a communication unit 32 and a drive 33.

The input unit 29 is formed of a keyboard, a mouse, a microphone and the like. The output unit 30 is formed of a display, a speaker and the like. The storage unit 31 is formed of a hard disk, a nonvolatile memory or the like.

The communication unit 32 is formed of a network interface and the like. The drive 33 drives a removable medium 34 such as a magnetic disk, an optical disk, a magneto-optical disk or a semiconductor memory.

In the personal computer 1 having the above configuration, the CPU 24 loads the programs stored, e.g., in the storage unit 31 into the RAM 26 through the input/output interface 28 and the bus 27, and executes it to perform various kinds of processing.

The program executed by the CPU 24 is provided, e.g., by recording it on the removable medium 34 that is a package medium or the like.

The magnetic disks (including a flexible disk), optical disks (CD-ROM (Compact Disc-Read Only Memory), DVD (Digital Versatile Disc) and others), magneto-optical disks or semiconductor memories are used as the package mediums.

The programs can be provided through cable or radio transmission medium such as local area networks, Internet, digital satellite broadcasting.

In the personal computer 1, the program can be installed in the storage unit 31 through the input/output interface 28 by attaching the removable medium 34 to the drive 33.

The communication unit 32 can receive the program through the cable or radio transmission medium, and it can be installed in the storage unit 31. Also, the program can be preinstalled in the ROM 25 or the storage unit 31.

The program executed by the personal computer 1 may be processing that is executed time-sequentially in the order described in this specification, or may be a program that executes processing in parallel or according to necessary timing such as calling.

[Configuration of SIM Tray Detection System]

Figure 4:
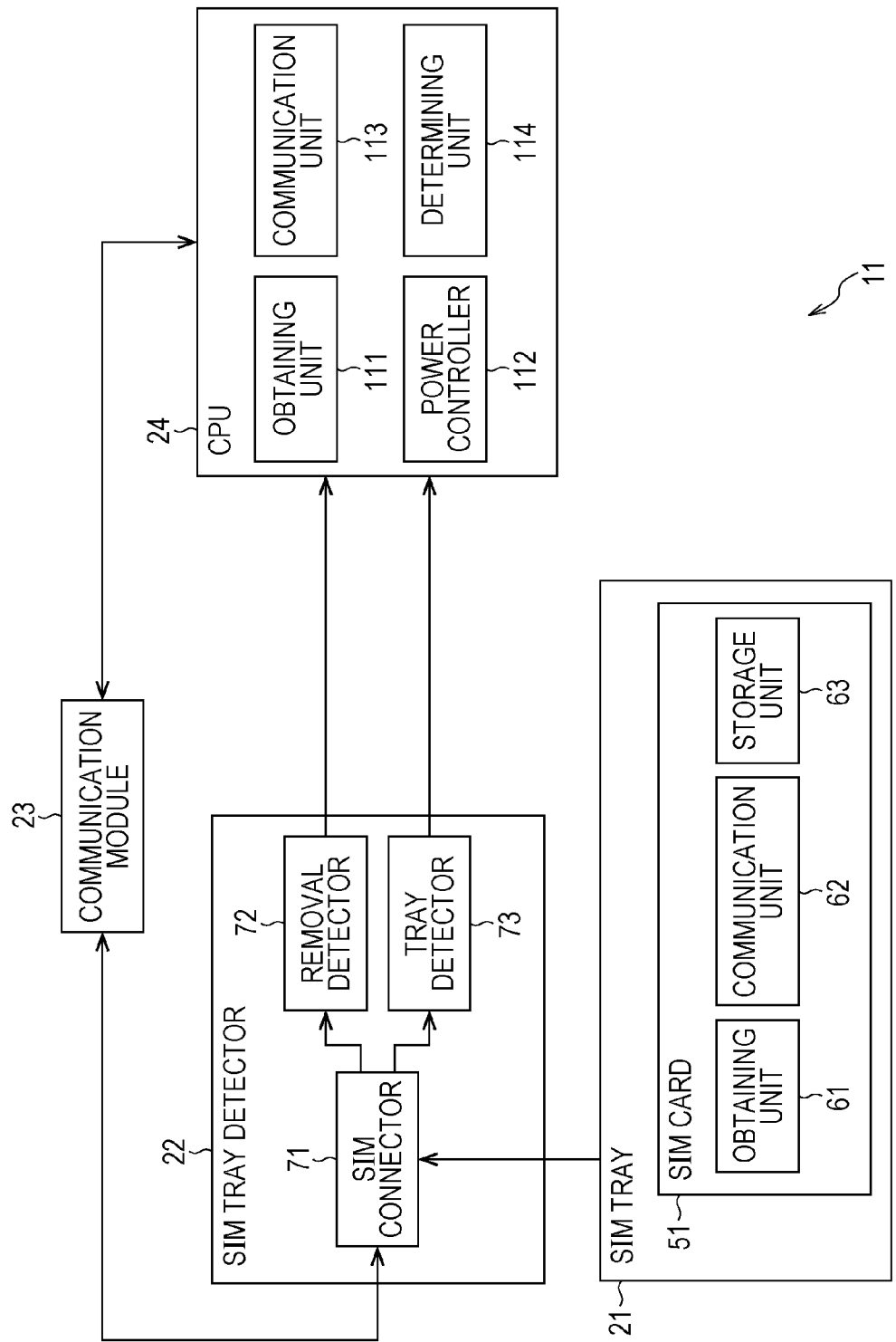
FIG. 4 is a block diagram showing a configuration of an embodiment of an SIM tray detection system of the present technique.

FIG. 4 shows a configuration of an embodiment of the SIM tray detection system 11 of the present technique.

The SIM tray detection system 11 in FIG. 4 is formed of the drive unit 20, the SIM tray 21, the SIM tray detector 22, the communication module 23 and the CPU 24.

The drive unit 20 drives the SIM tray 21 to eject it. The SIM tray 21 can store the SIM card 51. The SIM card 51 has an obtaining unit 61, a communication unit 62 and a storage unit 63. Blocks in the SIM card 51 can mutually transmit and receive signals and data when necessary.

The obtaining unit 61 obtains various kinds of information. The communication unit 62 sends and receives various kinds of information. The storage unit 63 stores the SIM card information.

Figure 5:
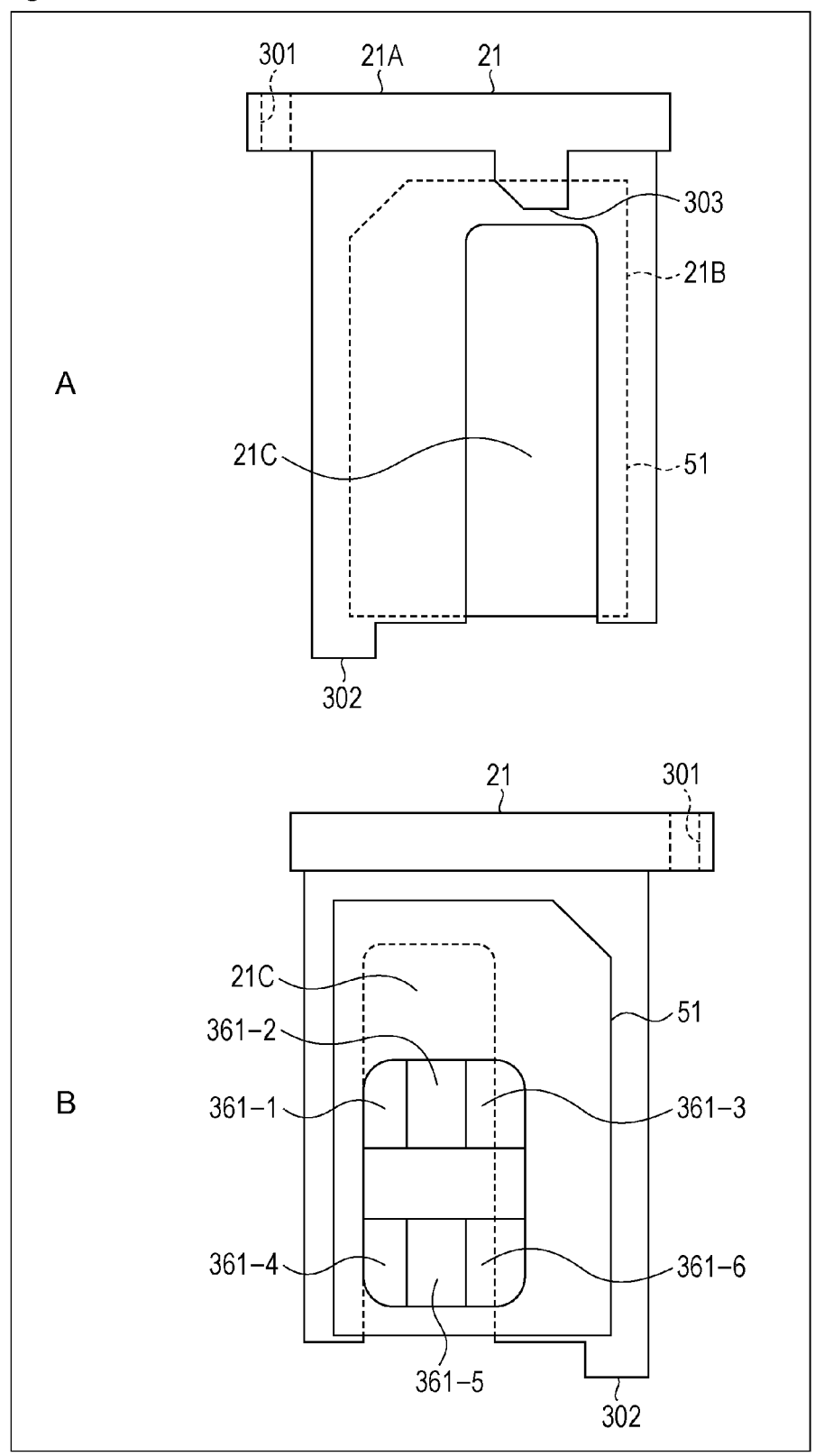
FIG. 5 shows an example of arrangement of an SIM tray and an SIM card.

Referring to FIG. 5, the SIM tray 21 and the SIM card 51 will be described.

FIG. 5 shows an example of arrangement of the SIM tray 21 and the SIM card 51. FIG. 5 shows, at A, a plan view of the SIM tray 21 storing the SIM card 51. FIG. 5 shows, at B, a bottom view of the SIM tray 21 storing the SIM card 51.

As shown at A in FIG. 5, the SIM tray 21 has the hole 301, a switch contact portion 302 and a convexity 303.

The hole 301 is formed on the right side in a front surface 21A of the SIM tray 21 for accepting the pin 321 in FIG. 2 and is shown by broken line.

The switch contact portion 302 formed in a deep position remotest from the front surface 21A of the SIM tray 21 comes into contact with an SIM tray contact portion 141 of a tray detector 73 which will be described later with reference to FIG. 6.

The convexity 303 comes into contact with a removing unit 201 of an SIM connector 71 which will be described later with reference to FIG. 6.

The SIM card 51 is fitted to a bottom side of the SIM tray 21. For this, the SIM tray 21 is provided at its bottom surface with an attaching portion 21B along an outer shape of the SIM card 51.

The SIM tray 21 may store the SIM card 51 in a method other than fitting.

As shown at B in FIG. 5, when the SIM card 51 is attached to the SIM tray 21, terminals 361-1-361-6 are exposed through a recess 21C of the SIM tray 21.

The terminals 361-1-361-6 are connected to terminals 202-1-202-6 of the SIM connector 71, respectively, which will be described later with reference to FIG. 7.

Returning to FIG. 4, the SIM tray detector 22 is formed of the SIM connector 71, a removal detector 72 and the tray detector 73. Referring to FIG. 6, the SIM tray detector 22 will be described.

Figure 6:
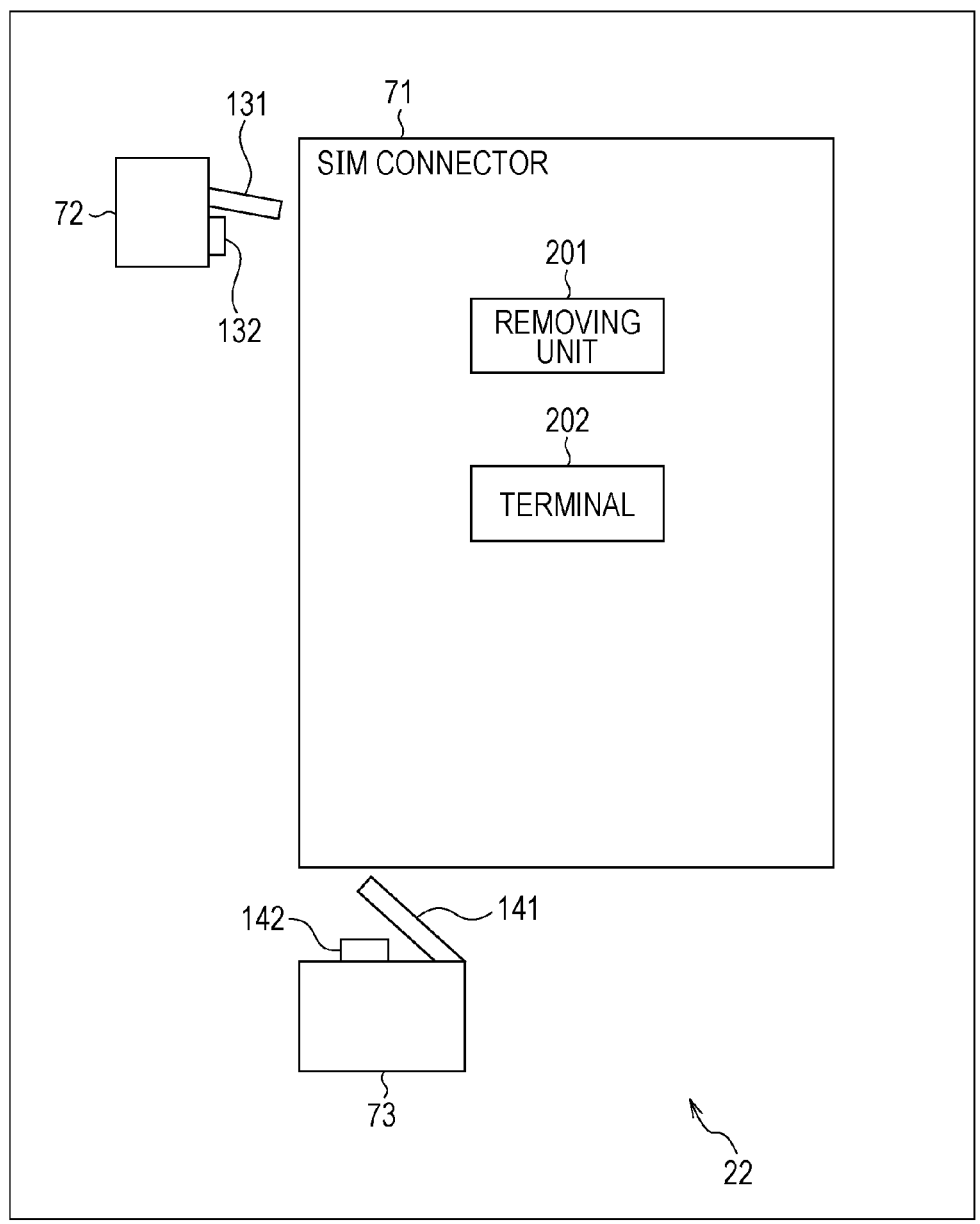
FIG. 6 shows a schematic configuration example of an SIM tray detector.

FIG. 6 shows a schematic configuration example of the SIM tray detector 22. The SIM connector 71, the removal detector 72 and the tray detector 73 are arranged as shown in FIG. 6.

Specifically, the removal detector 72 is arranged in a position to which the pin 321 inserted into the right (left in FIG. 6) hole 301 of the SIM tray 21 attached to the SIM connector 71 moves.

The SIM tray detector 73 is arranged in a position for contact with the switch contact portion 302 of the SIM tray 21.

The SIM connector 71 has the removing unit 201 and the terminals 202. Referring to FIG. 7, the SIM connector 71 will be described.

Figure 7:
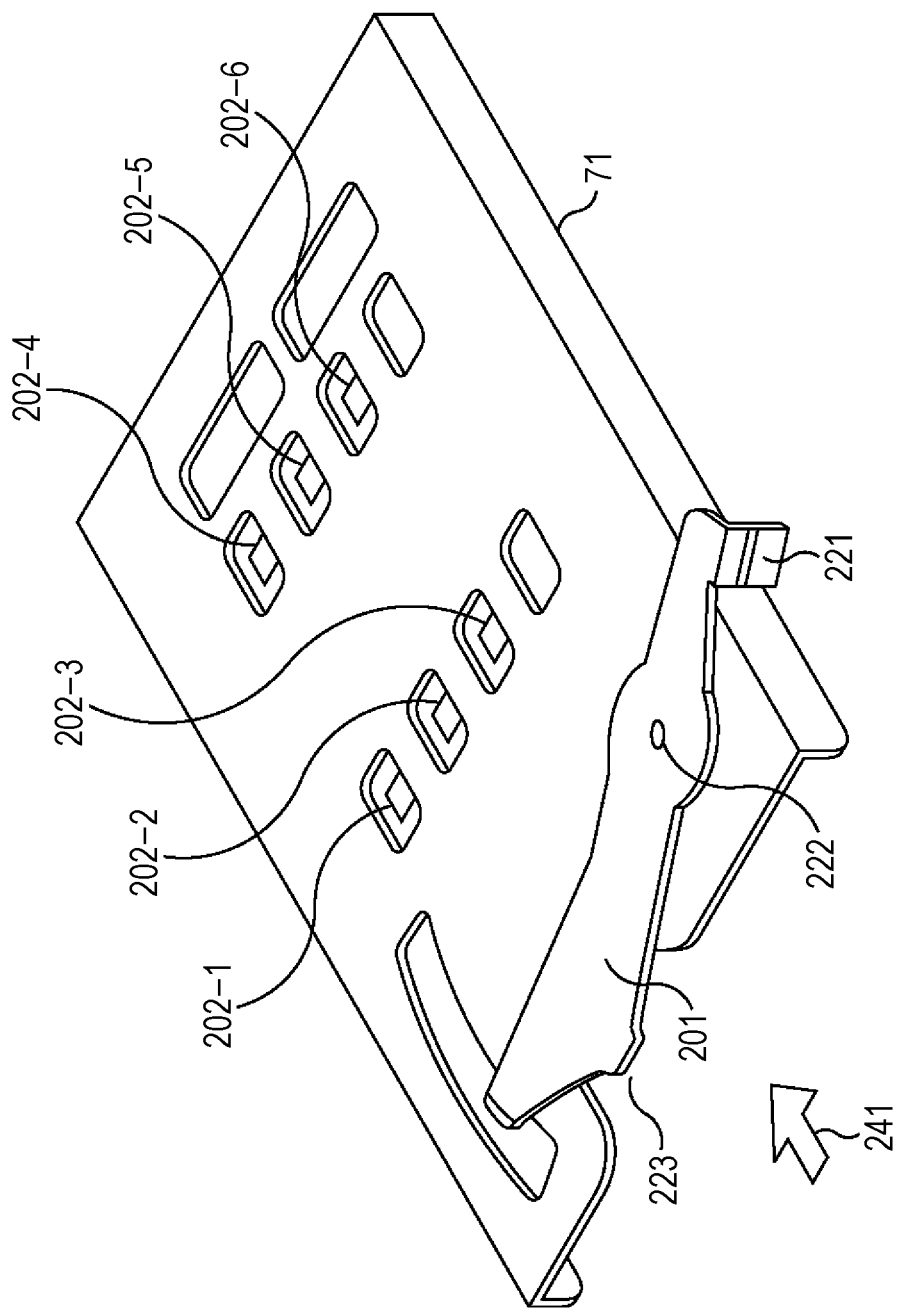
FIG. 7 shows a configuration example of an SIM connector.

FIG. 7 shows a configuration example of the SIM connector 71. The SIM connector 71 has the removing unit 201 and the terminals 202-1-202-6. The SIM tray 21 in FIG. 5 is inserted in the direction of an arrow 241 into the SIM connector 71 from the side near the switch contact portion 302.

The removing unit 201 is arranged on the SIM connector 71, and removes the SIM tray 21 inserted into the SIM connector 71. The removing unit 201 has a pin contact portion 221, a rotation shaft 222 and an SIM tray contact portion 223.

When the pin contact portion 221 or the SIM tray contact portion 223 is pushed, the removing unit 201 rotates around the rotation shaft 222. Details of the operation of the removing unit 201 will be described later with reference to FIG. 13.

The terminals 202-1-202-6 are arranged inside the SIM connector 71, and are connected to the terminals 361-1-361-6 of the SIM card 51 inserted into the SIM connector 71, respectively.

Specifically, the terminals 202-1 and 361-1 are connected together, the terminals 202-2 and 361-2 are connected together, the terminals 202-3 and 361-3 are connected together, the terminals 202-4 and 361-4 are connected together, the terminals 202-5 and 361-5 are connected together, and the terminals 202-6 and 361-6 are connected together.

Returning to FIG. 6, the removal detector 72 is formed of a pin contact portion 131 and a removal detecting switch 132.

The pin contact portion 131 is arranged above the removal detecting switch 132 in the figure, and pushes down the removal detecting switch 132 when it is pushed downward by the inserted pin 321 in FIG. 2.

When the removal detecting switch 132 is pushed down, i.e., when it is turned on, the removal detector 72 sends a removal detection signal H to the CPU 24.

When the pin 321 is pulled out, the pin contact portion 131 returns to an upper position in the figure and the removal detecting switch 132 is released from the downward pushing, i.e., the removal detecting switch 132 is turned off, the removal detector 72 sends a removal detection signal L to the CPU 24.

The tray detector 73 is formed of the SIM tray contact portion 141 and an SIM tray detecting switch 142.

The SIM tray contact portion 141 is arranged above the SIM tray detecting switch 142 in the figure, and pushes down the SIM tray detecting switch 142 when it is pushed downward by the switch contact portion 302 of the SIM tray 21 in FIG. 5.

When the SIM tray detecting switch 142 is pushed down, i.e., when it is turned on, the removal detector 73 sends a SIM tray detection signal H to the CPU 24.

When the SIM tray 21 is removed from the SIM connector 71 and the SIM tray contact portion 141 returns upward to release the downward pushing of the SIM tray detecting switch 142, i.e., when the SIM tray detecting switch 142 is turned off, the removal detector 73 sends a SIM tray detection signal L to the CPU 24.

Returning to FIG. 4, the CPU 24 controls various operations in accordance with the program. In the CPU 24, this program substantially provides function blocks of an obtaining unit 111, a power controller 112, a communication unit 113 and a determining unit 114.

The respective blocks in the CPU 24 can mutually transmit and receive the signals and data when necessary.

The obtaining unit 111 obtains various kinds of information. The power controller 112 controls the power supply to the SIM connector 71 through the communication module 23. The communication unit 113 sends and receives various kinds of information. The determining unit 114 executes various kinds of determination processing.

[SIM Card Detection Processing]

Then, referring to FIGS. 8 to 11, the SIM card detection processing will be described. In this case, the user attaches the SIM card 51 to the SIM tray 21, and inserts the SIM tray 21 into the hole 6.

Figure 8:
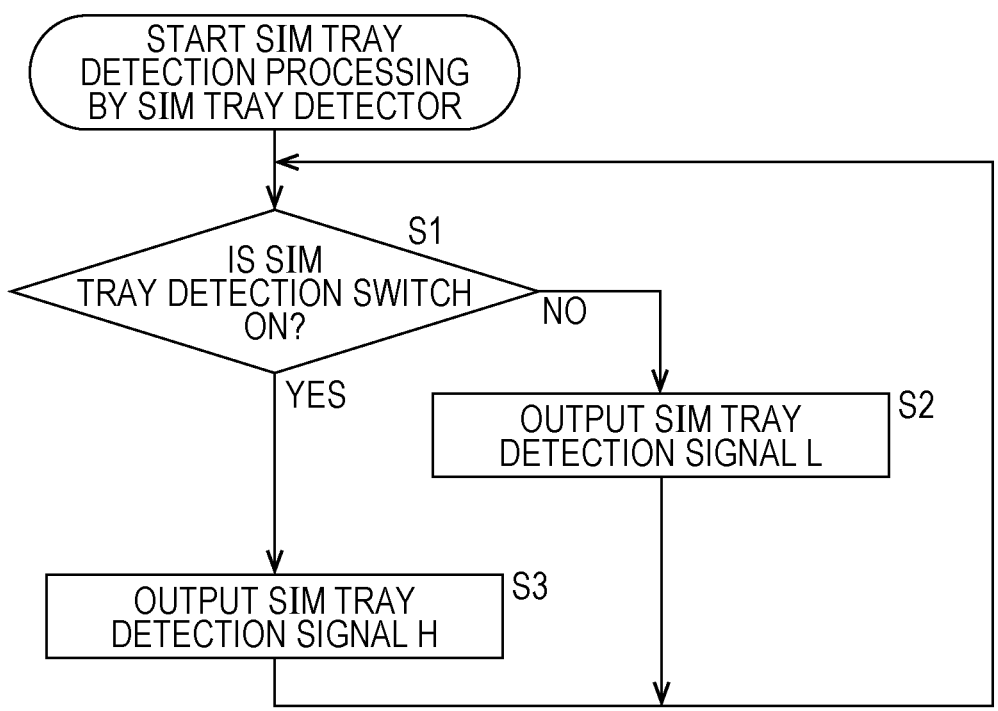
FIG. 8 is a flowchart illustrating SIM tray detection processing.
Figure 9:
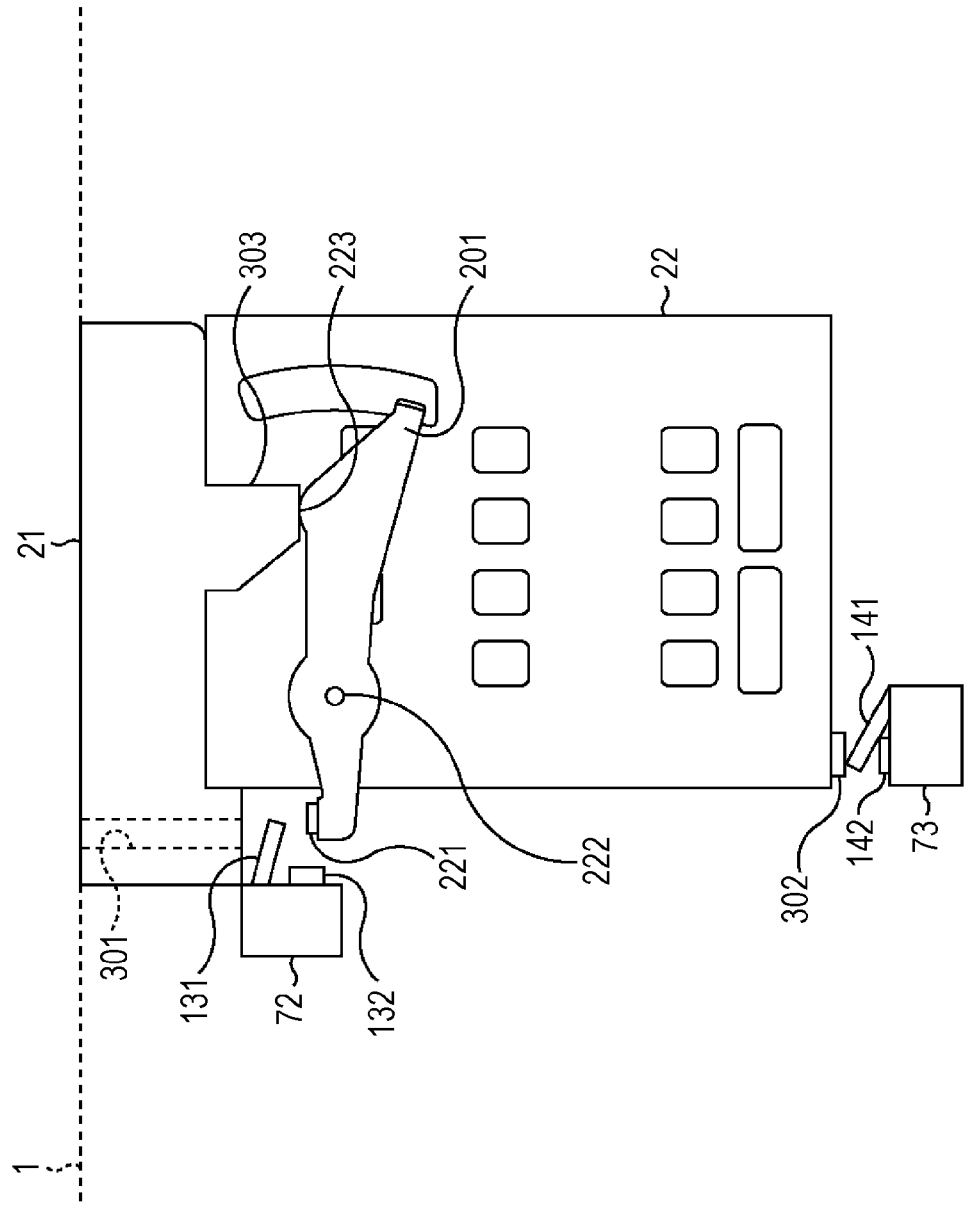
FIG. 9 shows an example of insertion of the SIM tray.
Figure 10:
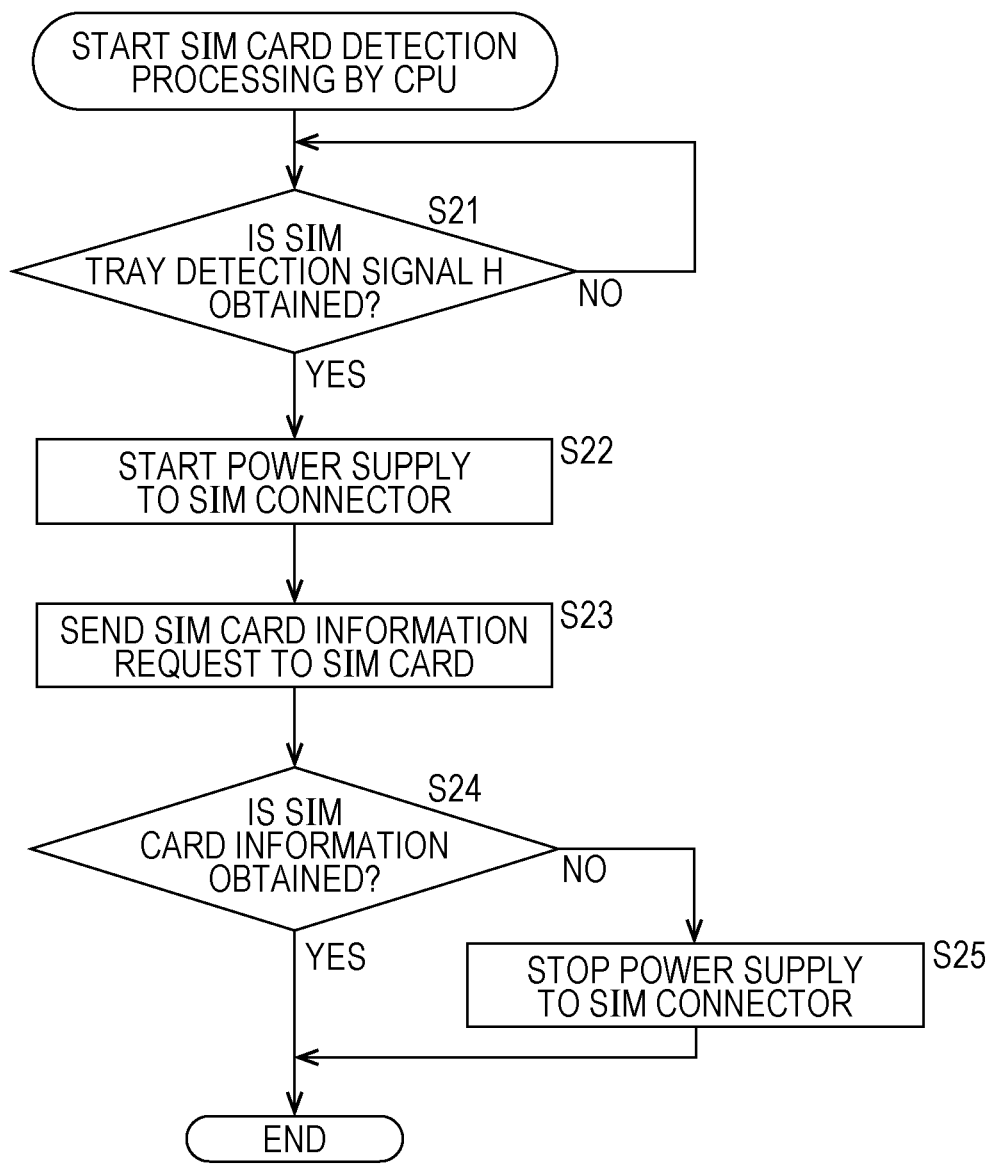
FIG. 10 is a flowchart illustrating SIM card detection processing.
Figure 11:
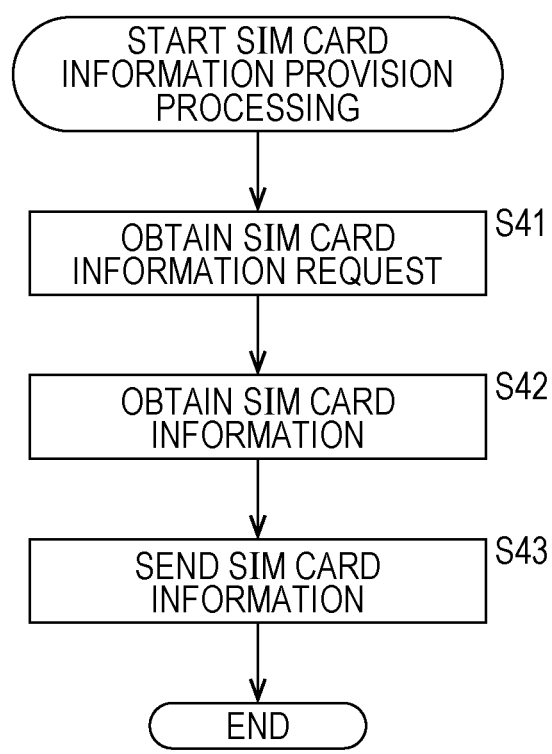
FIG. 11 is a flowchart illustrating information provision processing.

FIG. 8 is a flowchart illustrating the SIM tray detection processing of the SIM tray detector 22. FIG. 9 shows an example of insertion of the SIM tray 21. FIG. 10 is a flowchart illustrating the SIM card detection processing of the CPU 24. FIG. 11 is a flowchart illustrating the information provision processing of the SIM card 51.

In step S1, the tray detector 73 determines whether the SIM tray detecting switch 142 is turned on or not. Specifically, it determines whether the SIM tray 21 is inserted into the SIM connector 71 or not.

When the SIM tray 21 is inserted into a predetermined position, the switch contact portion 302 turns on the SIM tray detecting switch 142.

When it is determined in step S1 that the SIM tray detecting switch 142 is not yet turned on, the process proceeds to step S2.

In step S2, the tray detector 73 outputs the SIM tray detection signal L. Specifically, the CPU 24 receives a notification that the SIM tray 21 is not inserted into the SIM connector 71.

Conversely, when the SIM tray 21 is inserted into the predetermined position, it is determined in step S1 that the SIM tray detecting switch 142 is turned on. In this case, the process proceeds to step S3.

In step S3, the tray detector 73 outputs the SIM tray detection signal H. Specifically, the CPU 24 receives a notification that the SIM tray 21 is inserted into the SIM connector 71.

After the processing in steps S2 and S3, the process returns to step S1, and will repeat the subsequent processing.

The power controller 112 controls the drive unit 20 to drive and eject the SIM tray 21 until the SIM tray detecting switch 142 is turned on. The user pushes the SIM tray 21 against this driving force. When the SIM tray detecting switch 142 is turned on, this ejection driving stops.

Referring to FIG. 9, description will be given of the case where the SIM tray detecting switch 142 is turned on, i.e., where the SIM tray 21 is inserted into the SIM connector 71.

As shown in FIG. 9, when the SIM tray 21 is inserted into the SIM connector 71, the detecting switch contact portion 302 of the SIM tray 21 pushes downward the SIM tray contact portion 141 of the tray detector 73, and thereby pushes down the SIM tray detecting switch 142.

When the SIM tray 21 moves to the position where it pushes down the SIM tray detecting switch 142, the terminals 361-1-361-6 of the SIM card 51 stored in the SIM tray 21 are connected to the terminals 202-1-202-6 of the SIM connector 71, respectively.

In step S21 in FIG. 10, the determining unit 114 of the CPU 24 determines whether the SIM tray detection signal H is obtained or not. Specifically, it determines whether the obtaining unit 111 has obtained the SIM tray detection signal H sent from the tray detector 73 by the processing in step S3 in FIG. 8.

When it is determined in step S21 that the SIM tray detection signal H is not yet obtained, (i.e., when the SIM tray detection signal L output in step S2 in FIG. 8 is obtained), the process returns to step S21, and similar processing will be repeated.

Conversely, when it is determined in step S21 that the SIM tray detection signal H is obtained, the process proceeds to step S22.

In step S22, the power controller 112 of the CPU 24 starts the power supply to the SIM connector 71. Specifically, the SIM connector 71 receives the electric power through the communication module 23.

The start of the power supply to the SIM connector 71 establishes the connection between the CPU 24 and the SIM card 51.

In step S23, the communication unit 113 of the CPU 24 sends a request for the SIM card information to the SIM card 51. Specifically, it sends the request for the SIM card information to the SIM card 51 through the communication module 23 and the SIM connector 71.

In step S41 in FIG. 11, the obtaining unit 61 of the SIM card 51 obtains the request for the SIM card information. Specifically, in the processing in step S23 in FIG. 10, it obtains the request for the SIM card information sent from the CPU 24.

In step S42, the obtaining unit 61 of the SIM card 51 obtains the SIM card information. Specifically, it obtains the SIM card information stored in the storage unit 63. The SIM card information is, e.g., an ID (Identification) of the SIM card 51, a telephone number or the like.

In step S43, the communication unit 62 of the SIM card 51 sends the SIM card information to the CPU 24. Specifically, it sends the SIM card information obtained by the processing in step S42 to the CPU 24 through the SIM connector 71 and the communication module 23.

After the processing in step S43, the information providing processing of the SIM card 51 ends.

Returning to FIG. 10, the determining unit 114 of the CPU 24 determines in step S24 whether the SIM card information is obtained or not.

When it is determined in step S24 that the SIM card information is not obtained, i.e., the SIM tray 21 has not stored the SIM card 51, the process proceeds to step S25.

In step S25, the power controller 112 of the CPU 24 stops the power supply to the SIM connector 71.

Conversely, when it is determined in step S24 that the SIM card information is obtained, the SIM card detection processing of the CPU 24 ends after the processing in step S25. Thereby, the CPU 24 can detect the insertion of the SIM card 51.

[Removal Detection Processing]

Figure 12:
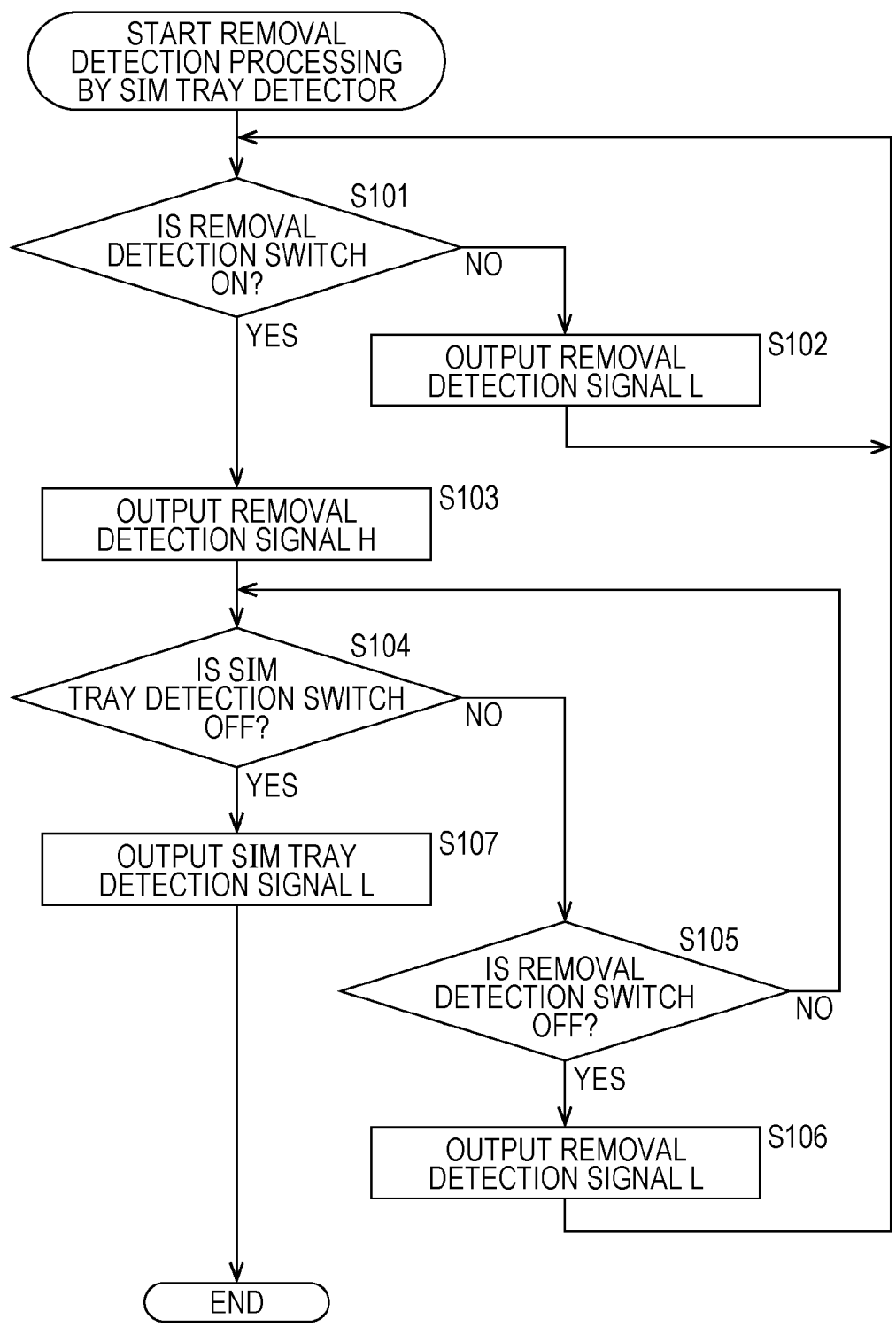
FIG. 12 is a flowchart illustrating removal detection processing.
Figure 13:
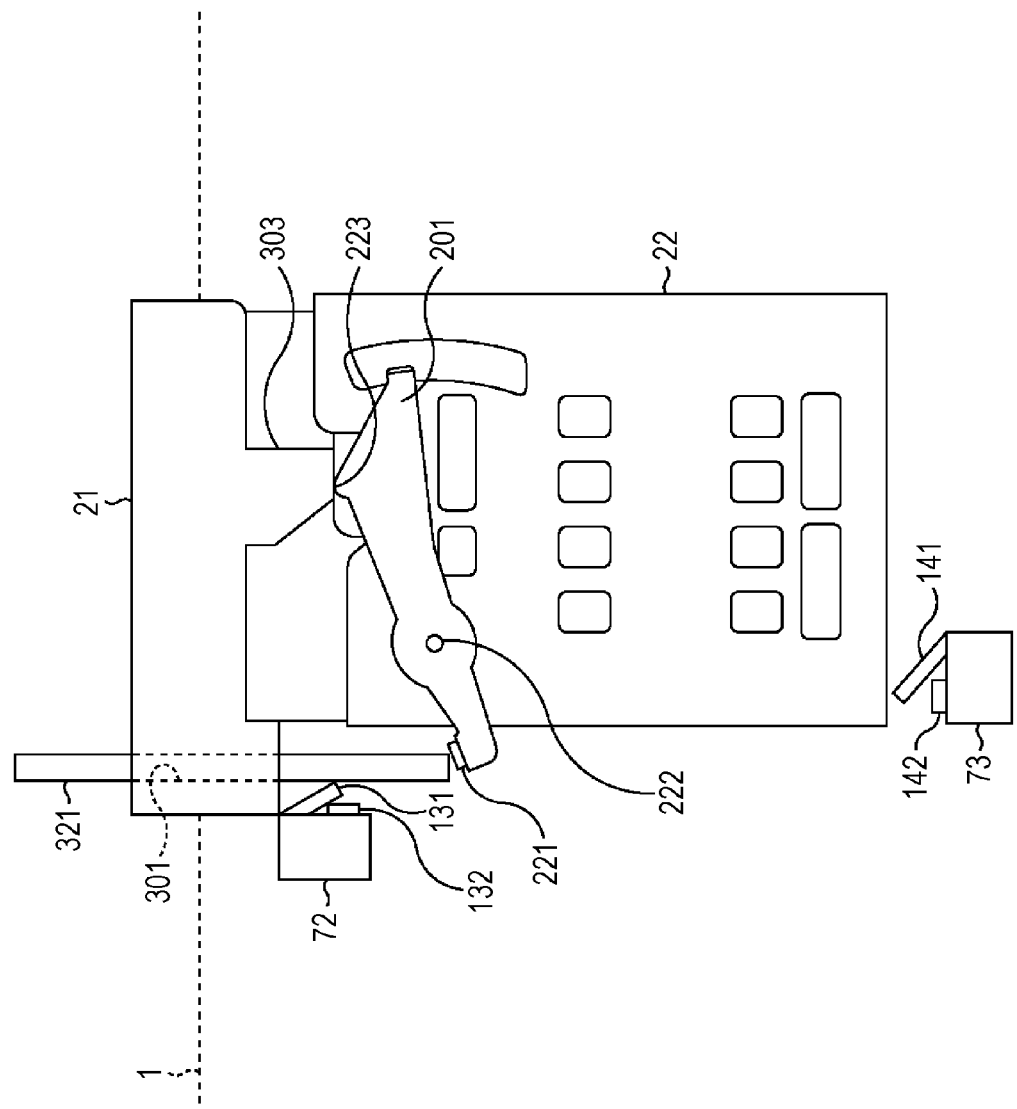
FIG. 13 illustrates an example of removal of the SIM tray.
Figure 14:
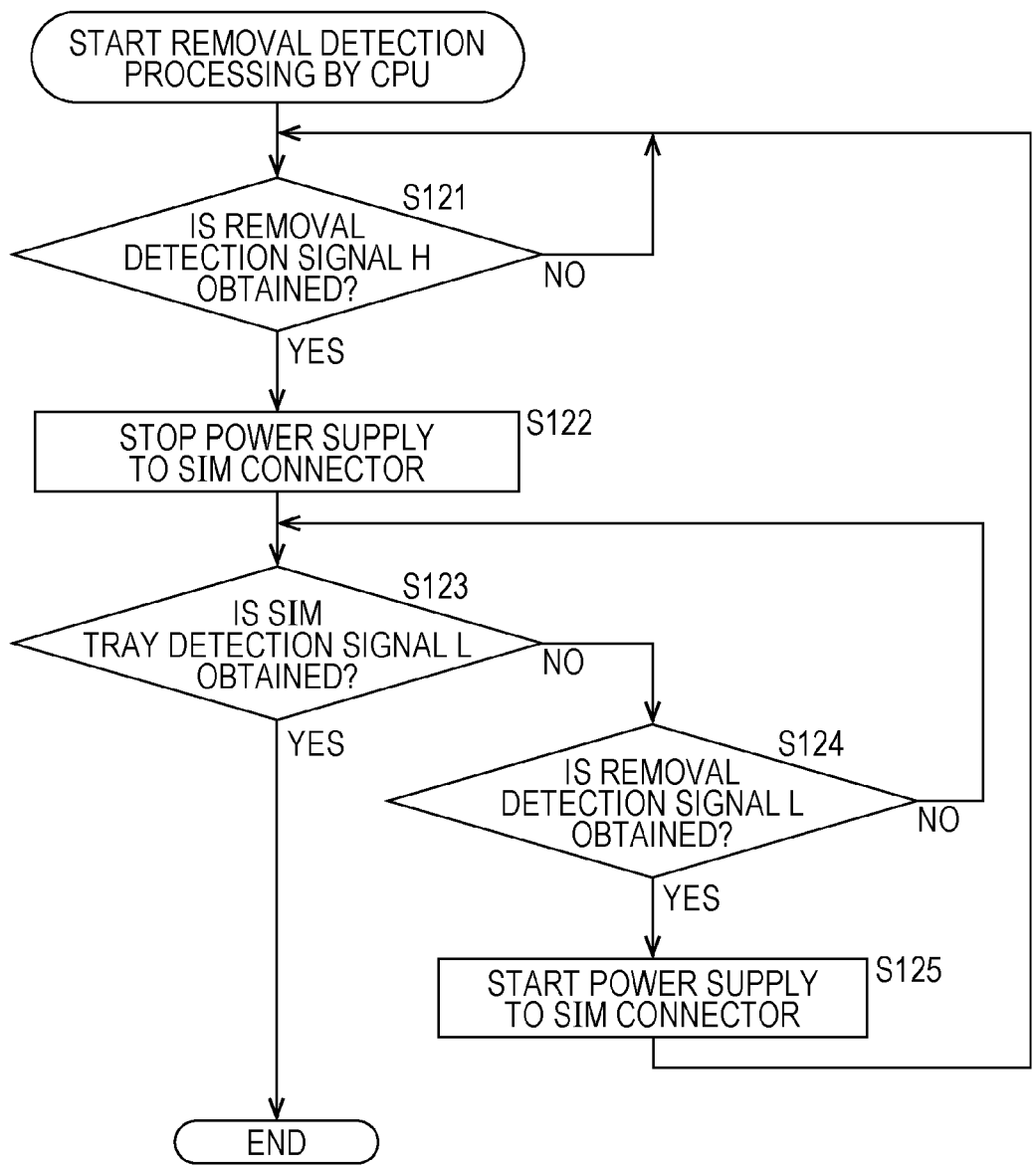
FIG. 14 is a flowchart illustrating removal detection processing.

Referring to FIGS. 12 to 14, the removal detection processing will be described.

FIG. 12 is a flowchart illustrating the removal detection processing of the SIM tray detector 22. FIG. 13 shows an example of the removal of the SIM tray 21. FIG. 14 is a flowchart illustrating the removal detection processing of the CPU 24.

When the SIM tray 21 is to be removed, the user inserts the pin 321 into the hole 301. Thereby, in step S101, the removal detector 72 determines whether the removal detecting switch 132 is turned on or not. Specifically, it is determined whether the pin 321 is inserted into the hole 301 of the SIM tray 21 or not.

When it is determined in step S101 that the removal detecting switch 132 is not yet turned on, the removal detector 72 outputs the removal detection signal L in step S102. Thereafter, the process returns to step S101, and similar processing is repeated.

Conversely, when it is determined in step S101 that the removal detecting switch 132 is turned on, the process proceeds to step S103. Referring to FIG. 13, description will be given of the case where the pin 321 is inserted into the hole 301 of the SIM tray 21.

As shown in FIG. 13, when the pin 321 is inserted into the hole 301 of the SIM tray 21, the pin 321 pushes the pin contact portion 131 of the removal detector 72 to push down the removal detecting switch 132.

Returning to FIG. 12, in step S103, the removal detector 72 outputs the removal detection signal H to the CPU 24. Specifically, the CPU 24 receives a notification that the operation of starting the removal of the SIM tray 21 is detected.

In step S121 in FIG. 14, the determining unit 114 of the CPU 24 determines whether the removal detection signal H is obtained or not. Specifically, it determines whether the obtaining unit 111 has obtained the removal detection signal H sent from the removal detector 72 by the processing in step S103 in FIG. 12, or not.

When it is determined in step S121 that the removal detection signal H is not yet obtained, the process returns to step S121, and similar processing will be repeated.

Conversely, when it is determined in step S121 that the removal detection signal H is obtained, the process proceeds to step S122.

In step S122, the power controller 112 of the CPU 24 stops the power supply to the SIM connector 71. The stop of the power supply disconnects the SIM card 51 from the CPU 24.

The power controller 112 controls the drive unit 20 to drive the SIM tray 21 in an ejecting direction.

When the insertion of the pin 321 into the hole 301 of the SIM tray 21 is detected, the CPU 24 stops the power supply to the SIM connector 71. This can reliably prevent the hot insertion and extraction of the SIM card 51.

Returning to FIG. 12, the tray detector 73 determines in step S104 whether the SIM tray detecting switch 142 is turned off or not.

Specifically, it is determined whether the removal of the SIM tray 21, the releasing of the pushing force against the switch contact portion 302 and the upward movement of the SIM tray contact portion 141 of the tray detector 73 have occurred or not.

When it is determined in step S104 that the SIM tray detecting switch 142 is not yet turned off, the removal detector 72 determines in step S105 whether the removal detecting switch 132 is turned off or not.

Specifically, it is determined whether the pin 321 is extracted from the hole 301 of the SIM tray 21 without removing the SIM tray 21 from the SIM connector 71, or not.

When it is determined in step S105 that the removal detecting switch 132 is not yet turned off, the process returns to step S104, and will repeat the subsequent processing.

Conversely, when it is determined in step S105 that the removal detecting switch 132 is turned off, i.e., when the pin 321 is extracted from the hole 301 of the SIM tray 21 without removing the SIM tray 21 from the SIM connector 71, the process proceeds to step S106.

In step S106, the removal detector 72 outputs the removal detection signal L. Specifically, the CPU 24 receives a notification that the pin 321 is extracted from the hole 301 of the SIM tray 21.

After the processing of step S106, the process returns to step S101, and will repeat the subsequent processing.

In step S123 in FIG. 14, the determining unit 114 of the CPU 24 determines whether the SIM tray detection signal L is obtained or not. Specifically, it is determined whether the SIM tray detection signal L is sent or not by the processing in step S107 in FIG. 12 to be described later.

When it is determined in step S123 that the SIM tray detection signal L is not yet obtained, the determining unit 114 of the CPU 24 determines in step S124 whether the removal detection signal L is obtained or not.

When it is determined in step S124 that the removal detection signal L is not yet obtained, the process returns to step S123, and will repeat the subsequent processing.

Conversely, when it is determined in step S124 that the removal detection signal L is obtained, i.e., when the obtaining unit 111 obtains the removal detection signal L sent by the processing in step S106 after the removal detection signal H is output by the processing in step S103 in FIG. 12, the process proceeds to step S125.

In step S125, the power controller 112 of the CPU 24 starts the power supply to the SIM connector 71. The drive unit 20 stops driving of the SIM tray 21 in the ejecting manner.

Specifically, when the pin 321 once inserted into the hole 301 of the SIM tray 21 is extracted therefrom before removing the SIM tray 21, the SIM connector 71 is supplied with the power supply voltage again. This establishes the connection between the CPU 24 and the SIM card 51.

After the processing in step S125, the process returns to step S121, and will repeat the subsequent processing.

Returning to FIG. 12, when it is determined in step S104 that the SIM tray detecting switch 142 is turned off, i.e., when the SIM tray 21 is removed, the process proceeds to step S107.

As shown in FIG. 13, when the pin 321 pushing down the pin contact portion 131 of the removal detector 72 is further inserted, the pin 321 pushes downward in the figure the pin contact portion 221 of the removing unit 201.

When the pin 321 pushes downward the pin contact portion 221 of the removing unit 201, the removing unit 201 rotates counterclockwise in the figure around the rotation shaft 222.

As the removing unit 201 rotates, the SIM tray contact portion 223 of the removing unit 201 moves upward in FIG. 13, and pushes upward the convexity 303 of the SIM tray 21.

Consequently, the SIM tray 21 is pushed upward by the removing unit 201 to project partially from the casing of the personal computer 1.

The user pulls out the pin 321 from the hole 301, and holds a part of the projected SIM tray 21 to remove the SIM tray 21 from the personal computer 1.

By removing the SIM tray 21, the switch contact portion 302 of the SIM tray 21 is spaced from the SIM tray contact portion 141 of the tray detector 73.

Accordingly, the SIM tray contact portion 141 of the tray detector 73 moves upward in FIG. 13, and the SIM tray detecting switch 142 is turned off.

Returning to FIG. 12, the tray detector 73 outputs the SIM tray detection signal L in step S107. Specifically, the CPU 24 receives a notification of removal of the SIM tray 21.

After the processing in step S107, the removal detection processing of the SIM tray detector 22 ends.

When it is determined in step S123 in FIG. 14 that the SIM tray detection signal L is obtained, i.e., when the obtaining unit 111 obtains the SIM tray detection signal L sent by the processing in step S107 in FIG. 12, the removal detection processing of the CPU 24 ends.

As described above, the removal detector 72 detects the insertion of the pin 321 into the hole 301 of the SIM tray 21. Thus, it detects the operation of starting the removal of the SIM tray 21 before the removing unit 201 removes the SIM tray 21. Therefore, the hot insertion and extraction can be reliably prevented.

Also, when the SIM card 51 (the SIM tray 21) is to be inserted or extracted, removal of the battery or the like is not required so that the user can insert and extract the SIM card 51 without difficulty.

Further, the SIM tray detector 22 can be arranged in an arbitrary position of the casing of the personal computer 1. This increases the flexibility in design of the personal computer 1, and allows application to the personal computers 1 of various forms and designs.

Since only insertion of the pin 321 is required for removing the SIM tray 21, the installation space can be reduced as compared with the case of arranging a lid or the like, and further the personal computer 1 equipped with them can ensure the rigidity.

Second Embodiment

Configuration of SIM Tray Detection System

Figure 15:
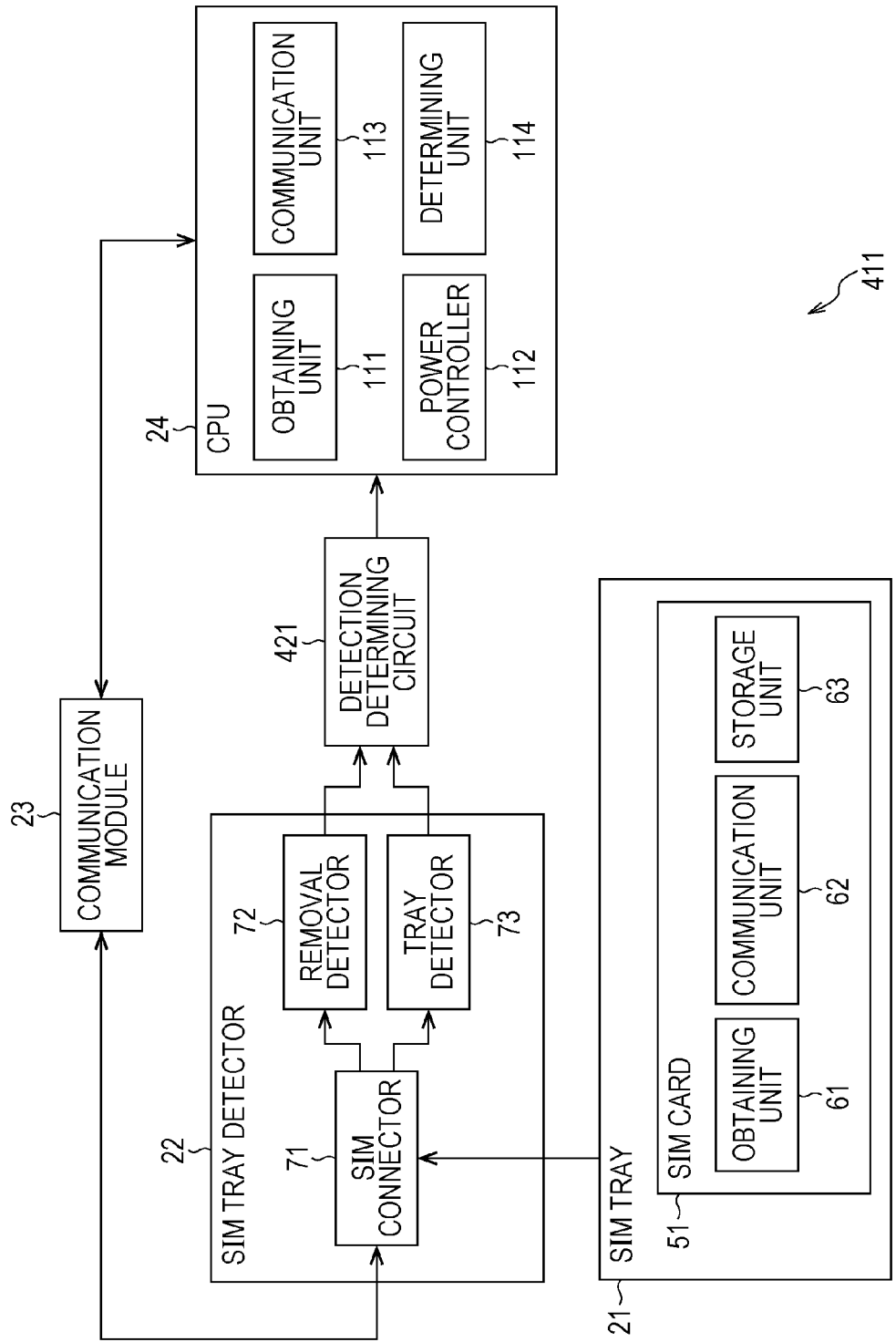
FIG. 15 is a block diagram showing a configuration of another embodiment of the SIM tray detection system of the present technique.

FIG. 15 shows a configuration of another embodiment of an SIM tray detection system 411 employing the present technique.

In the SIM tray detection system 411 in FIG. 15, elements corresponding to those in the SIM tray detection system 11 in FIG. 4 bear the same reference numbers, respectively.

Specifically, the SIM tray detection system 411 in FIG. 15 differs from the SIM tray detection system 11 in FIG. 4 in provision of a detection determining circuit 421 and elimination of the drive unit 20, and other configurations are the same as those of the SIM tray detection system 11.

Naturally, this embodiment may employ the drive unit 20.

Figure 16:
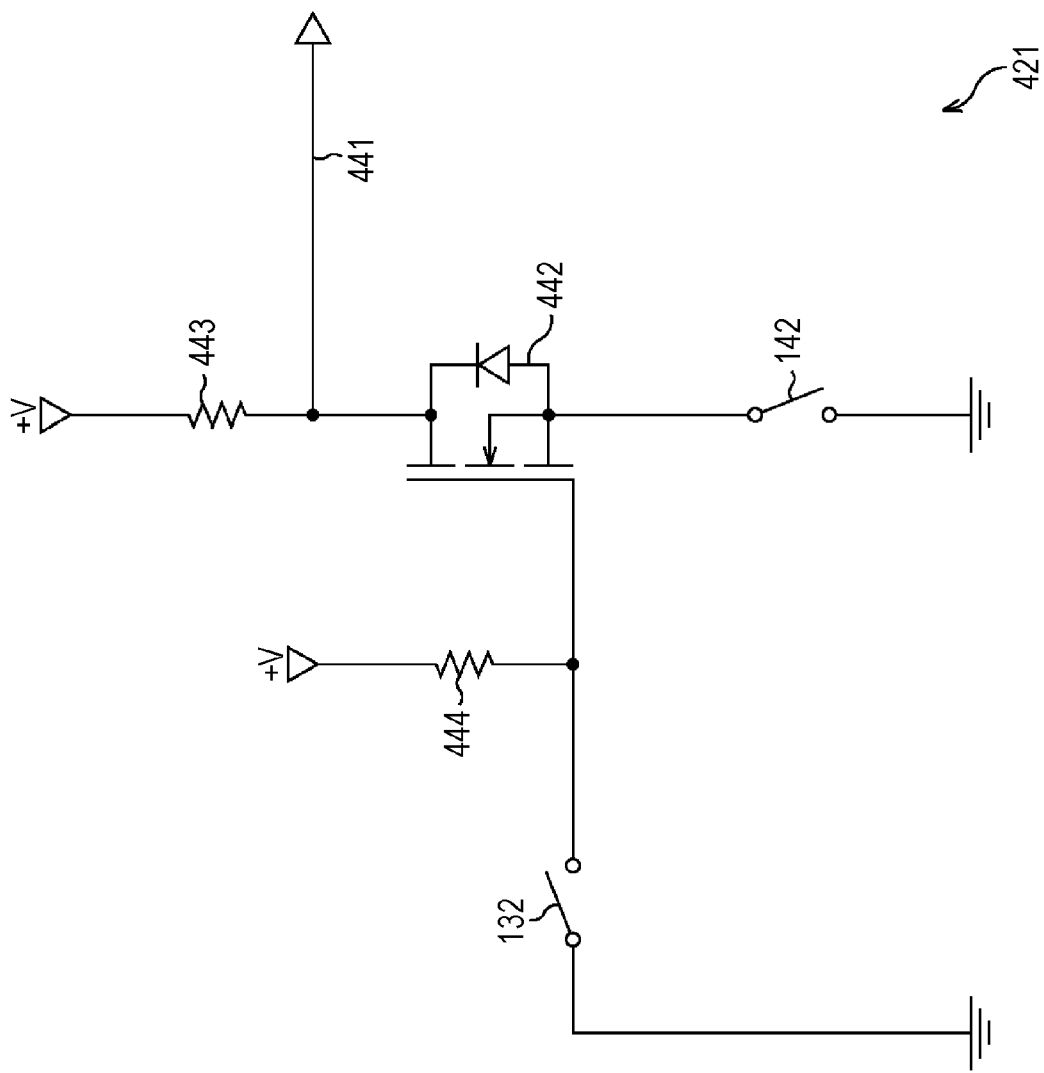
FIG. 16 shows an example of a detection determining circuit.

The detection determining circuit 421 produces a SIM removal signal based on detection results of a removal detector 72 and a tray detector 73, and outputs the SIM removal signal to a CPU 24. Referring to FIG. 16, the detection determining circuit 421 will be described.

FIG. 16 shows an example of the detection determining circuit 421. The detection determining circuit 421 is formed of a removal detecting switch 132, an SIM tray detecting switch 142, an output signal line 441, a field effect transistor 442, and resistances 443 and 444.

For the sake of illustration, the detection determining circuit 421 in the example in FIG. 16 has the removal detecting switch 132 and the SIM tray detecting switch 142. However, it may have another configuration provided that the on-off switching can be performed according to the same timing as the removal detecting switch 132 and the SIM tray detecting switch 142.

The output signal line 441 and a drain of the field effect transistor 442 receive a power supply voltage V through the resistance 443. A gate of the field effect transistor 442 receives the power supply voltage V through the resistance 444.

When the removal detecting switch 132 is switched between on and off, a gate voltage of the field effect transistor 442 attains a low level or a high level.

When the gate voltage of the field effect transistor 442 is at a high level (i.e., the removal detecting switch 132 is off), the output signal line 441 attains a low or high level in accordance with on/off switching of the SIM tray detecting switch 142.

The output signal line 441 outputs the SIM removal signal at a low or high level to the CPU 24.

[Power Supply Processing]

Figure 17:
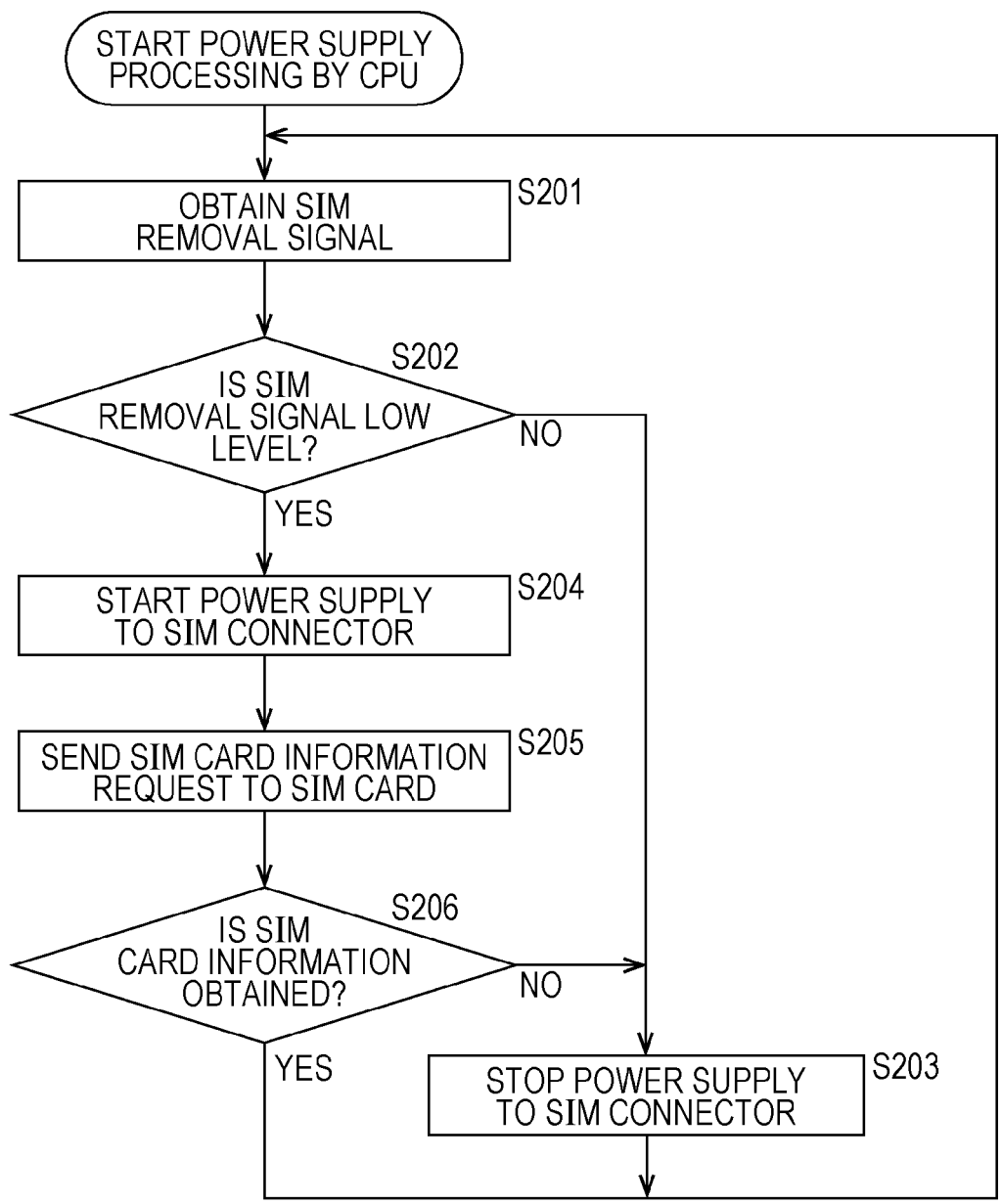
FIG. 17 is a flowchart illustrating power supply processing.

Referring to FIGS. 17 and 18, power supply processing will be described. FIG. 17 is a flowchart illustrating the power supply processing of the CPU 24. FIG. 18 illustrates the output of the SIM removal signal.

Referring to FIG. 17, processing from step S203 to step S206 corresponds to that from step S22 to step S25 in FIG. 10. This processing will be described simply for avoiding repetition.

A power supply processing of the CPU 24 in FIG. 17 starts when a personal computer 1 starts.

In step S201, an obtaining unit 111 of the CPU 24 obtains the SIM removal signal. Specifically, it obtains the SIM removal signal output from the output signal line 441 of the detection determining circuit 421.

In step S202, a determining unit 114 of the CPU 24 determines whether the SIM removal signal is at a low level or not.

More specifically, as shown in FIG. 18, it determines whether a removal detecting switch 132 is off and an SIM tray detecting switch 142 is on, or not (i.e., whether an SIM tray 21 is inserted into an SIM connector 71, or not).

When it is determined in step S202 that the SIM removal signal is not at a low level, i.e., when the SIM removal signal is at a high level, the process proceeds to step S203.

As shown in FIG. 18, the SIM removal signal attains a high level when the removal detecting switch 132 is off and the SIM tray detecting switch 142 is off, or when the removal detecting switch 132 is on (i.e., when the removal detecting switch 132 is on and the SIM tray detecting switch 142 is on, or when the removal detecting switch 132 is on and the SIM tray detecting switch 142 is off).

Thus, the SIM removal signal attains a high level when the SIM tray 21 is not inserted into the SIM connector 71, or when a pin 321 is inserted into a hole 301 of the SIM tray 21.

In step S203, a power controller 112 of the CPU 24 stops the power supply to the SIM connector 71.

Specifically, the supply of the power supply voltage stops when the SIM tray 21 is not inserted into the SIM connector 71, or when the pin 321 is inserted into the hole 301 of the SIM tray 21.

After the processing in step S203, the process returns to step S201, and will repeat the subsequent processing.

In the processing of step S203, when the power supply to the SIM connector 71 was stopped, the process may skip the processing in step S203 and may return to step S201.

Conversely, when it is determined in step S202 that the SIM removal signal is at a low level, i.e., when the SIM tray 21 is inserted into the SIM connector 71, the process advances to step S204.

In step S204, the power controller 112 of the CPU 24 starts the power supply to the SIM connector 71.

In the processing in step S204, when the power supply to the SIM connector 71 has already started, the process may skip the processing from step S204 to step S206, and may return to step S201.

In step S205, a communication unit 113 of the CPU 24 sends a request for the SIM card information to an SIM card 51.

In step S41 in FIG. 11, an obtaining unit 61 of the SIM card 51 obtains the request for the SIM card information. In step S42, the obtaining unit 61 of the SIM card 51 obtains the SIM card information.

In step S43, a communication unit 62 of the SIM card 51 sends the SIM card information to the CPU 24. The information providing processing of the SIM card 51 ends after the processing in step S43.

Returning to FIG. 17, the determining unit 114 of the CPU 24 determines in step S206 whether the SIM card information is obtained or not.

When it is determined in step S206 that the SIM card information is not obtained, the power controller 112 of the CPU 24 stops the power supply to the SIM connector 71 in step S203.

Conversely, when it is determined in step S206 that the SIM card information is obtained, the process returns to step S201, and will repeat the subsequent processing.

As described above, provision of the detection determining circuit 421 can reduce the amount of processing of the CPU 24, and allows simpler detection of the insertion and extraction of the SIM tray 21.

[Others]

In the specification, the term of system means a whole device formed of a plurality of devices, means and others.

The forms of implementing the present technique are not restricted to the above embodiments, and may be varied in various manners without departing from the substance of the present technique. In the forms of implementing the present technique, other device(s) may have a part of functions.

In the forms of implementing the present technique, the CPU 24 controls various kinds of processing. However, an EC (Embedded Controller) may be employed apart from the CPU 24, and the EC may control various kinds of processing instead of the CPU 24.

In the forms of implementing the present technique, the SIM connector 71 has the six terminals 202 and the SIM card 51 has the six terminals 361. However, the numbers of the terminals 202 and 361 are not restricted to it.

The present technique can be applied to information processing devices using the SIM card such as cellular phones, in addition to the personal computers. The present technique can likewise be applied to the case where the tray stores a storage member other than the SIM card.

The present technique can have the following configurations.

(1) An information processing device including a removing unit removing a tray storing a storage member, and a removal detector detecting an operation of starting removal of the tray before the removing unit removes the tray.

(2) The information processing device described in the above (1), and further including a power controller controlling power supplying to the storage member. The power controller stops the power supplying to the storage member when the removal detector detects the operation of starting the removal of the tray.

(3) The information processing device described in the above (2), and further including a tray detector detecting insertion of the tray. The power controller starts power supplying to the storage member when the tray detector detects the insertion of the tray.

(4) The information processing device described in the above (3), and further including a detection determining unit outputting a removal signal based on detection results of the removal detector and the tray detector. The detection determining unit outputs the removal signal at a first level when the removal detector does not detect the operation of starting the removal of the tray, and the tray detector detects the insertion of the tray. The power controller starts the power supplying to the storage member when the removal signal output from the detection determining unit is at the first level.

(5) The information processing device described in the above (4). The detection determining unit outputs the removal signal at a second level when the removal detector detects the operation of starting the removal of the tray, and when the removal detector does not detect the operation of starting the removal of the tray and the tray detector does not detect insertion of the tray. The power controller stops the power supplying to the storage member when the removal signal output from the detection determining unit is at the second level.

(6) An information processing method including a removing step of removing a tray storing a storage member, and a removal detecting step of detecting an operation of starting removal of the tray before the processing in the removing step removes the tray.

(7) A computer-readable storage medium bearing a program causing a computer to execute a removing step of removing a tray storing a storage member, and a removal detecting step of detecting an operation of starting removal of the tray before the processing in the removing step removes the tray.

(8) A program causing a computer to execute a removing step of removing a tray storing a storage member, and a removal detecting step of detecting an operation of starting removal of the tray before the processing in the removing step removes the tray.

REFERENCE SIGNS LIST

1 Personal computer
21 SIM tray
51 SIM card
71 SIM connector
72 Removal detector
73 Tray detector
112 Power controller
421 Detection determining unit

The invention claimed is:

1. An information processing device, comprising:
a removal detector configured to detect an operation that corresponds to removal of a tray, based on a first insertion of an object into the tray up to a first position; and
a removing unit configured to remove the tray based on a second insertion of the object into the tray up to a second position different from the first position,
wherein the tray is configured to store a storage member, and
wherein the operation is detected before removal of the tray.

2. The information processing device according to claim 1, further comprising a power controller configured to stop power supply to the storage member based on the operation that is detected.

3. The information processing device according to claim 2, further comprising:
a tray detector configured to detect the second insertion of the tray into a slot of the information processing device,
wherein the power controller is configured to start the power supply to the storage member based on the second insertion of the tray.

4. The information processing device according to claim 3, further comprising:
   a detection determining unit configured to output a removal signal at a first level based on a first determination that the removal detector detects other than the operation, and the tray detector detects the second insertion of the tray,
   wherein the power controller is further configured to start the power supply to the storage member based on a second determination that the removal signal output from the detection determining unit is at the first level.

5. The information processing device according to claim 4, wherein
   the detection determining unit is further configured to output the removal signal at a second level based on a third determination that the removal detector detects the operation, and the tray detector detects other than the second insertion of the tray, and
   the power controller is further configured to stop the power supply to the storage member based on a fourth determination that the removal signal output from the detection determining unit is at the second level.

6. The information processing device according to claim 3, wherein the tray detector is further configured to:
   detect that the inserted tray is electrically connected to the storage member; and
   drive the storage member.

7. The information processing device according to claim 4, further comprising a communication unit configured to send a request for storage member information to the storage member.

8. The information processing device according to claim 7, wherein
   the detection determining unit is further configured to detect whether the storage member information is obtained, and
   the power controller is further configured to stop the power supply to the storage member, based on a fifth determination that the storage member information is unavailable.

9. The information processing device according to claim 8, wherein the storage member information comprises identification information of the storage member.

10. The information processing device according to claim 1, wherein the object comprises a pin configured to push a removal detector switch to detect the first insertion.

11. An information processing method, comprising:
    detecting an operation corresponding to removal of a tray, based on a first insertion of an object into the tray up to a first position; and
    removing the tray based on a second insertion of the object into the tray up to a second position different from the first position,
    wherein the tray is configured to store a storage member, and
    wherein the operation is detected before removal of the tray.

12. A non-transitory computer-readable medium having stored thereon, computer-executable instructions for causing a computer to execute operations, the operations comprising:
    detecting an operation corresponding to removal of a tray, based on a first insertion of an object into the tray up to a first position; and
    removing the tray based on a second insertion of the object into the tray up to a second position different from the first position,
    wherein the tray is configured to store a storage member, and
    wherein the operation is detected before removal of the tray.

* * * * *